United States Patent
Kawabe et al.

(10) Patent No.: US 7,208,033 B2
(45) Date of Patent: Apr. 24, 2007

(54) INK, INK JET RECORDING METHOD, INK CARTRIDGE, AND INK JET RECORDING APPARATUS

(75) Inventors: Minako Kawabe, Kawasaki (JP); Koichi Osumi, Tokyo (JP); Shinichi Tochihara, Hadano (JP); Hiroshi Tomioka, Tokyo (JP); Hiroyuki Takuhara, Machida (JP); Hideki Yamakami, Yokohama (JP); Itaru Tsuji, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/233,016

(22) Filed: Sep. 23, 2005

(65) Prior Publication Data

US 2006/0065157 A1 Mar. 30, 2006

Related U.S. Application Data

(63) Continuation of application No. PCT/JP05/07192, filed on Apr. 7, 2005.

(30) Foreign Application Priority Data

Apr. 8, 2004 (JP) ............................. 2004-114671

(51) Int. Cl.
   *C09D 11/00* (2006.01)
   *C09D 11/02* (2006.01)

(52) U.S. Cl. .................. 106/31.48; 106/31.49

(58) Field of Classification Search ............. 106/31.48, 106/31.49; 347/100
   See application file for complete search history.

(56) References Cited

U.S. PATENT DOCUMENTS

| | | | |
|---|---|---|---|
| 4,167,509 A * | 9/1979 | Parton | 534/606 |
| 4,723,129 A | 2/1988 | Endo et al. | 346/1.1 |
| 4,740,796 A | 4/1988 | Endo et al. | 346/1.1 |
| 4,923,515 A | 5/1990 | Koike et al. | 106/22 |
| 4,973,499 A | 11/1990 | Iwata et al. | 427/261 |
| 4,986,850 A | 1/1991 | Iwata et al. | 106/25 |
| 5,078,790 A | 1/1992 | Tochihara et al. | 106/20 |
| 5,080,716 A | 1/1992 | Aoki et al. | 106/20 |
| 5,099,255 A | 3/1992 | Koike et al. | 346/1.1 |
| 5,101,217 A | 3/1992 | Iwata et al. | 346/1.1 |

(Continued)

FOREIGN PATENT DOCUMENTS

| | | |
|---|---|---|
| JP | 09-291240 A | 11/1997 |
| JP | 2002-504613 | 2/2002 |
| JP | 2006/071822 * | 3/2006 |
| WO | WO 01/66651 A1 | 9/2001 |

OTHER PUBLICATIONS

Derwent abstract of JP2006/071822, Mar. 2006.*

Primary Examiner—Helene Klemanski
(74) Attorney, Agent, or Firm—Fitzpatrick, Cella, Harper & Scinto

(57) ABSTRACT

An ink comprising yellow colorants and a colorant having a phthalocyanine skeleton, in which the yellow colorants are at least a colorant represented by the following general formula I and C.I. Direct Yellow 132

6 Claims, 6 Drawing Sheets

U.S. PATENT DOCUMENTS

| | | | |
|---|---|---|---|
| 5,125,969 A | 6/1992 | Nishiwaki et al. | 106/22 |
| 5,131,949 A | 7/1992 | Tochihara et al. | 106/20 |
| 5,132,700 A | 7/1992 | Tochihara et al. | 346/1.1 |
| 5,135,571 A | 8/1992 | Shirota et al. | 106/22 |
| 5,137,570 A | 8/1992 | Nishiwaki et al. | 106/22 |
| 5,148,186 A | 9/1992 | Tochihara et al. | 346/1.1 |
| 5,213,613 A | 5/1993 | Nagashima et al. | 106/20 R |
| 5,256,194 A | 10/1993 | Nishiwaki et al. | 106/22 R |
| 5,258,066 A | 11/1993 | Kobayashi et al. | 106/22 R |
| 5,296,022 A | 3/1994 | Kobayashi et al. | 106/20 D |
| 5,395,434 A | 3/1995 | Tochihara et al. | 106/22 R |
| 5,409,529 A | 4/1995 | Nagashima et al. | 106/22 H |
| 5,415,686 A | 5/1995 | Kurabayashi et al. | 106/26 R |
| 5,476,541 A | 12/1995 | Tochihara | 106/22 K |
| 5,478,383 A | 12/1995 | Nagashima et al. | 106/22 H |
| 5,482,545 A | 1/1996 | Aoki et al. | 106/22 K |
| 5,485,188 A | 1/1996 | Tochihara et al. | 347/100 |
| 5,733,363 A | 3/1998 | Nagashima et al. | 106/31.43 |
| 5,733,637 A | 3/1998 | Moriya et al. | 428/207 |
| 5,738,932 A | 4/1998 | Kondo et al. | 428/195 |
| 5,804,320 A | 9/1998 | Tomioka et al. | 428/478.2 |
| 5,835,116 A | 11/1998 | Sato et al. | 347/98 |
| 5,933,164 A | 8/1999 | Sato et al. | 347/43 |
| 5,936,649 A | 8/1999 | Ikeda et al. | 347/87 |
| 5,955,185 A | 9/1999 | Yoshino et al. | 428/304.4 |
| 5,965,252 A | 10/1999 | Santo et al. | 428/329 |
| 5,976,233 A | 11/1999 | Osumi et al. | 106/31.86 |
| 5,989,650 A | 11/1999 | Inamoto et al. | 427/487 |
| 6,003,987 A | 12/1999 | Yamamoto et al. | 347/100 |
| 6,221,141 B1 | 4/2001 | Takada et al. | 106/31.6 |
| 6,280,513 B1 | 8/2001 | Osumi et al. | 106/31.6 |
| 6,332,919 B2 | 12/2001 | Osumi et al. | 106/31.6 |
| 6,342,095 B1 | 1/2002 | Takizawa et al. | 106/31.27 |
| 6,375,317 B1 | 4/2002 | Osumi et al. | 347/100 |
| 6,425,662 B1 | 7/2002 | Teraoka et al. | 347/100 |
| 6,460,989 B1 | 10/2002 | Yano et al. | 347/101 |
| 6,474,804 B2 | 11/2002 | Osumi et al. | 347/100 |
| 6,488,752 B1 | 12/2002 | Kenworthy et al. | 106/31.48 |
| 6,506,239 B1 | 1/2003 | Osumi et al. | 106/31.27 |
| 6,511,534 B1 | 1/2003 | Mishina et al. | 106/31.33 |
| 6,517,199 B1 | 2/2003 | Tomioka et al. | 347/101 |
| 6,521,034 B1 | 2/2003 | Osumi et al. | 106/31.6 |
| 6,533,852 B2 * | 3/2003 | Hirose | 106/31.48 |
| 6,533,853 B1 | 3/2003 | Mishina et al. | 106/31.6 |
| 6,536,890 B1 | 3/2003 | Kato et al. | 347/100 |
| 6,540,329 B1 | 4/2003 | Kaneko et al. | 347/43 |
| 6,547,381 B2 | 4/2003 | Watanabe et al. | 347/100 |
| 6,558,740 B1 | 5/2003 | Santo et al. | 427/146 |
| 6,565,950 B1 | 5/2003 | Tomioka et al. | 428/195 |
| 6,572,692 B1 | 6/2003 | Osumi et al. | 106/31.6 |
| 6,619,791 B2 | 9/2003 | Tochihara et al. | 347/100 |
| 6,659,601 B2 | 12/2003 | Goto et al. | 347/100 |
| 6,685,999 B2 | 2/2004 | Ichihose et al. | 428/32.25 |
| 6,706,104 B2 | 3/2004 | Takuhara et al. | 106/31.6 |
| 6,719,420 B2 | 4/2004 | Tomioka et al. | 347/100 |
| 6,723,835 B1 * | 4/2004 | Millard et al. | 534/772 |
| 6,729,718 B2 | 5/2004 | Goto et al. | 347/100 |
| 6,733,120 B2 | 5/2004 | Ogasawara et al. | 347/100 |
| 6,746,114 B2 | 6/2004 | Takahashi et al. | 347/100 |
| 6,773,101 B2 | 8/2004 | Tochihara et al. | 347/100 |
| 6,780,901 B1 | 8/2004 | Endo et al. | 523/160 |
| 6,821,328 B2 | 11/2004 | Tomioka et al. | 106/31.33 |
| 6,830,709 B2 | 12/2004 | Tomioka et al. | 252/506 |
| 6,863,391 B2 | 3/2005 | Tomloka et al. | 347/100 |
| 6,966,944 B2 | 11/2005 | Shimomura et al. | 106/31.43 |
| 7,025,817 B2 | 4/2006 | Kanke et al. | 106/31.51 |
| 2004/0244622 A1 | 12/2004 | Ichihose et al. | 101/491 |
| 2005/0057607 A1 | 3/2005 | Tomloka et al. | 347/43 |
| 2005/0284332 A1 | 12/2005 | Shinjo et al. | 106/31.27 |
| 2006/0011097 A1 * | 1/2006 | Tsuji et al. | 106/31.48 |
| 2006/0065157 A1 | 3/2006 | Kawabe et al. | 106/31.48 |
| 2006/0137569 A1 | 6/2006 | Osumi et al. | 106/31.13 |
| 2006/0137570 A1 | 6/2006 | Osumi et al. | 106/31.27 |
| 2006/0139428 A1 | 6/2006 | Osumi et al. | 347/100 |
| 2006/0139429 A1 | 6/2006 | Osuml et al. | 347/100 |
| 2006/0152570 A1 | 7/2006 | Ishlkawa et al. | 347/105 |
| 2006/0192827 A1 | 8/2006 | Takada et al. | 347/100 |
| 2006/0194056 A1 | 8/2006 | Nagashima et al. | 428/403 |
| 2006/0194897 A1 | 8/2006 | Kawabe et al. | 523/160 |
| 2006/0196389 A1 | 9/2006 | Tsuji et al. | 106/34.43 |

* cited by examiner

INK, INK JET RECORDING METHOD, INK CARTRIDGE, AND INK JET RECORDING APPARATUS

This application is a continuation of International Application No. PCT/JP2005/007192, filed Apr. 7, 2005, which claims the benefit of Japanese Patent Application No. 2004-114671, filed Apr. 8, 2004.

BACKGROUND OF THE INVENTION

1. Field of the Invention

The present invention relates to an ink, an ink jet recording method, an ink cartridge, and an ink jet recording apparatus.

2. Related Background Art

Ink jet recording involves allowing fine ink droplets to fly by virtue of various working principles to adhere to a recording medium, thereby forming an image, a letter, or the like. The ink jet recording has rapidly become widespread in various applications because it has the following characteristics. For example, the ink jet recording can be performed at high speed, generates low noise, facilitates multi-coloring, has high flexibility of a recording pattern, and eliminates the need for development and fixation.

In recent years, the ink jet recording has been requested to provide an image having high quality comparable to that of a silver salt photograph. In the ink jet recording, a full-color image is formed on the basis of substractive color mixture. That is, color reproduction is performed by using a yellow ink, a magenta ink, and a cyan ink as three primary color inks of printing. In other words, in order to realize a high-quality ink jet image, each of the yellow ink, the magenta ink, and the cyan ink as three primary color inks must have high brightness and high chroma.

However, when one attempts to represent an entire region of a hue by means of three primary color inks, even if the three primary color inks to be used each have good color developability, a color region to be represented by mixture of the three primary color inks does not have sufficient chroma, and hence a color reproduction region that can be represented may be insufficient. In view of the above, there has been proposed a method in which a color ink intermediate in hue angle in a hue space between adjacent two inks of the three primary color inks such as a red ink, an orange ink, a green ink, a violet ink, or a blue ink is used in addition to the three primary inks to perform image formation.

It has become also necessary that a printed matter obtained by means of ink jet recording can be stored for a long period of time. In other words, the printed product must have excellent weatherability of an image such as a discoloration resistance of an image due to sunlight, various illuminations, and the like (light resistance) or a discoloration resistance of an image due to an oxidative gas (for example, ozone, $NO_x$, or $SO_x$) present in a trace amount in the atmosphere (gas resistance).

To solve the above problems and to expand a color reproduction range of a yellow region, an azopyridone-type dye having a specific structure has been disclosed as a colorant having high color developability and excellent weatherability, and an ink using the dye has been also disclosed (see, for example, Japanese Patent Application Laid-open No. 2002-504613).

SUMMARY OF THE INVENTION

The inventors of the present invention have prepared an ink containing the colorant described in JP 2002-504613 A (a colorant represented by the general formula I in the present invention), and have formed an image by using the ink. The color developability and weatherability of an image formed by using the ink alone were good. The inventors have combined the above ink with another colorant to prepare another ink having a desired color, and have formed an image by using the other ink. As a result, the color developability of the image was sufficient. However, the weatherability of the image, especially the light resistance was poor, and the degree of discoloration resistance of the image due to sunlight, various illuminations, and the like was equal to or lower than the weatherability of each colorant. In other words, the light resistance of the colorant represented by the general formula I may deteriorate depending on a colorant to be used in combination.

Further investigation conducted by the inventors have resulted in a finding that the weatherability remarkably deteriorates when the colorant represented by the general formula I is used in combination with a colorant having a phthalocyanine skeleton. JP 2002-504613 A does not refer to the weatherability in the case where the colorant represented by the general formula I is used in combination with another colorant. Such a prior art involves a problem in that weatherability deteriorates when the colorant represented by the general formula I is used in combination with a colorant having a phthalocyanine skeleton. At present, the problem has not been fully solved. The inventors have also found that it is difficult to alleviate the deterioration of weatherability caused by a combination of colorants by merely devising, for example, a solvent of ink. Accordingly, the inventors have acquired an acknowledgement that a technique for suppressing the deterioration of light resistance is needed when the colorant represented by the general formula I is used in combination with a colorant having a phthalocyanine skeleton.

Therefore, an object of the present invention is to provide an ink with which an image having high color developability and excellent weatherability can be obtained even when a colorant represented by the general formula I is used in combination with a colorant having a phthalocyanine skeleton.

Another object of the present invention is to provide an ink jet recording method, an ink cartridge, and an ink jet recording apparatus each using the ink.

In view of the above objects, the inventors of the present invention have conducted extensive studies. As a result, the inventors have found that an ink having a desired color and good weatherability can be obtained when C.I. Direct Yellow 132 is allowed to be present in the ink together with the colorant represented by the general formula I and a colorant having a phthalocyanine skeleton, thereby completing the present invention.

That is, according to one aspect of the present invention, there is provided an ink including: yellow colorants; and a colorant having a phthalocyanine skeleton, in which the yellow colorants are at least a colorant represented by the following general formula I and C.I. Direct Yellow 132.

General formula I

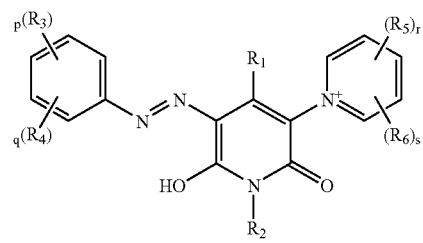

(In the general formula I: $R_1$ and $R_2$ each independently represent a substituted or unsubstituted alkyl group, aryl group, or arylalkyl group, or a hydrogen atom; $R_3$ and $R_5$ each independently represent a carboxyl group or a salt thereof, a sulfonic group or a salt thereof, a phosphate group or a salt thereof, or an alkyl group in which any one of these groups is substituted; $R_4$ and $R_6$ each independently represent a group except those defined for $R_3$ and $R_5$; p and r each independently represent an integer of 1 to 5; q and s each independently represent an integer of 0 to 4; and $p+q \leq 5$ and $r+s \leq 5$.)

In further aspect of the ink, it is preferable that: a total content of the yellow colorants in the ink be 80 mass % or more with respect to the total content of the colorants in the ink; a total content of the colorant represented by the general formula I and C.I. Direct Yellow 132 be 85 mass % or more with respect to the total content of the yellow colorants; a content of the colorant represented by the general formula I in the ink be 0.3 mass time to 2.0 mass times a content of C.I. Direct Yellow 132 in the ink; and the colorant represented by the general formula I be a colorant represented by the following structural formula I or a salt thereof.

Structural formula I

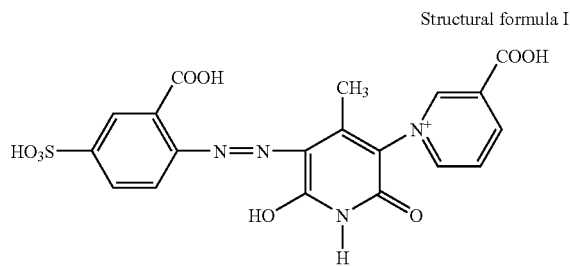

According to another aspect of the present invention, there is provided an ink jet recording method, characterized by applying the above ink to a recording medium by means of an ink jet head to form an image.

According to another aspect of the present invention, there is provided an ink cartridge characterized by including the above ink.

According to another aspect of the present invention, there is provided an ink jet recording apparatus, characterized by including the above ink mounted thereon.

According to the present invention, even when the colorant represented by the general formula I is used in combination with the colorant having a phthalocyanine skeleton, weatherability becomes good without any damage to the color developability of the colorant represented by the general formula I. As a result, there can be provided an ink with which an image having high color developability and excellent weatherability (especially light resistance) can be obtained.

DESCRIPTION OF THE PREFERRED EMBODIMENTS

Figure 1:
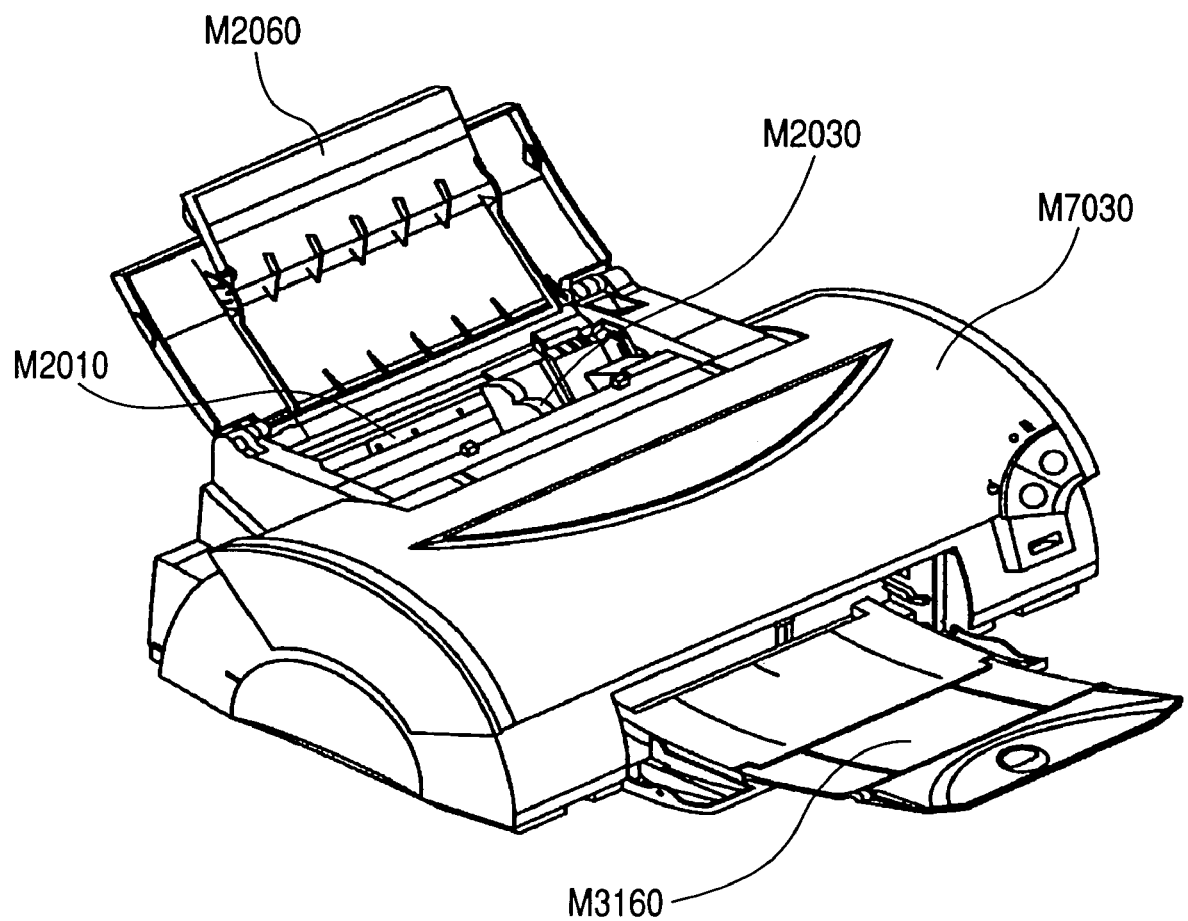
FIG. 1 is a perspective view of a recording apparatus.

Hereinafter, the present invention will be described in more detail by way of the best mode for carrying out the invention.

(Ink)

The ink according to the present invention essentially contains a colorant represented by the following general formula I, C.I. Direct Yellow 132, and a colorant having a phthalocyanine skeleton. A generally used dye or pigment other than those colorants, or a newly synthesized dye or pigment may be further added to the ink as long as the addition provides an effect and does not impair the object and effect of the present invention. Hereinafter, details about the respective components constituting the ink according to the present invention will be described.

(Colorant)

The colorants used in the present invention are the colorant represented by the following general formula I, C.I. Direct Yellow 132, and the colorant having a phthalocyanine skeleton.

General formula I

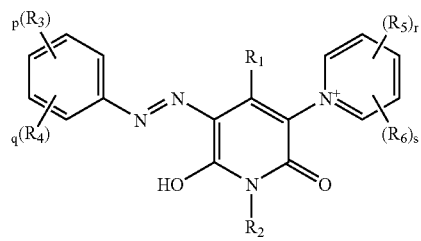

(In the general formula I: $R_1$ and $R_2$ each independently represent a substituted or unsubstituted alkyl group, aryl group, or arylalkyl group, or a hydrogen atom; $R_3$ and $R_5$ each independently represent a carboxyl group or a salt thereof, a sulfonic group or a salt thereof, a phosphate group or a salt thereof, or an alkyl group in which any one of these groups is substituted; $R_4$ and $R_6$ each independently represent a group except those defined for $R_3$ and $R_5$; p and r each independently represent an integer of 1 to 5; q and s each independently represent an integer of 0 to 4; and $p+q \leq 5$ and $r+s \leq 5$.)

(Colorant Represented by General Formula I and C.I. Direct Yellow 132)

The colorant represented by the general formula I has good color developability, and can expand the color reproduction range of yellow region. Therefore, the color developability of green region becomes particularly good when the colorant is used in combination with a colorant having a phthalocyanine skeleton to be described later. In addition, the colorant represented by the general formula I has excellent weatherability.

An ink containing only the colorant represented by the general formula I was prepared, and an image was formed by using the ink. The color developability and weatherability of the image formed by using the ink alone were good. Another ink was prepared by combining the colorant represented by the general formula I and a colorant having a phthalocyanine skeleton, and an image was formed by using the other ink. As a result, the color developability of the image was sufficient. However, the weatherability of the image, especially the light resistance was poor, and the degree of discoloration resistance of the image due to sunlight, various illuminations, and the like was equal to or lower than the weatherability of each colorant.

In view of the above, in the ink of the present invention, C.I. Direct Yellow 132 is used in combination with the colorant represented by the general formula I and the colorant having a phthalocyanine skeleton. A detailed mechanism is not elucidated, by which C.I. Direct Yellow 132 is used in combination with the colorant represented by the general formula I and the colorant having a phthalocyanine skeleton to provide excellent weatherability.

In particular, in the present invention, a remarkable effect is obtained when the colorant represented by the general formula I is Exemplified Compound 1 shown below. Exemplified Compound 1 is excellent in color developability and weatherability, and has a hue close to that of C.I. Direct Yellow 132. Therefore, even when discoloration occurs in an image formed on a recording medium by using the ink of the present invention owing to the disappearance of Exemplified Compound I due to light or gas, C.I. Direct Yellow 132 having a hue close to that of Exemplified Compound 1 remains. Accordingly, a change of the image due to discoloration is small, and hence the weatherability increases.

Exemplified Compound 1

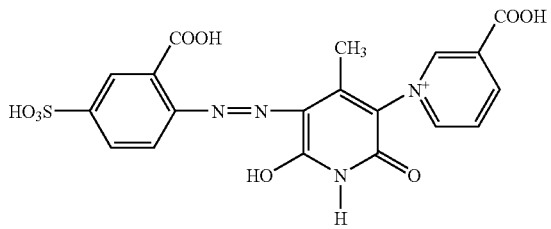

[Colorant Having Phthalocyanine Skeleton]

In the present invention, a colorant having a phthalocyanine skeleton is used in combination with the colorant represented by the general formula I and C.I. Direct Yellow 132. The colorant having a phthalocyanine skeleton is preferable because it is excellent in color developability of cyan and green hue regions and light resistance.

Specific examples of the colorant having a phthalocyanine skeleton are shown below. However, the present invention is not limited to those examples. The specific examples include: C.I. Direct Blue 86 and 199; a dye prepared by introducing a structure capable of absorbing a yellow light component into the phthalocyanine skeleton described in JP 09-291240 A (for example, a condensation product of a phthalocyanine residue and a monoazo dye residue); and a compound represented by the following general formula II. Of those, a compound represented by the general formula II is preferable from the viewpoint of weatherability. In addition, each of the colorants each having a phthalocyanine skeleton can be used alone, or two or more of them can be used as a mixture.

General formula II

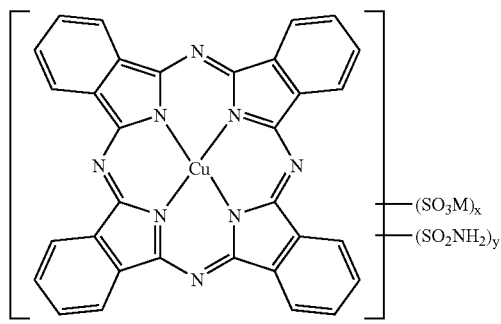

(In the general formula II: M represents an alkali metal or ammonium; x represents an integer of 1 to 4; y represents an integer of 0 to 3; and one in which x+y=2 or less is not included or substantially not included.)

That is, the compound represented by the general formula II is any one of the dyes having structures shown in Table 1 below, or a mixture of them, and is free of or substantially free of a component in which x+y=2.

TABLE 1

|  | X | Y |
|---|---|---|
| Exemplified Compound | 2 | 1 | 2 |
|  | 3 | 2 | 1 |
|  | 4 | 3 | 0 |
|  | 5 | 1 | 3 |
|  | 6 | 2 | 2 |
|  | 7 | 3 | 1 |
|  | 8 | 4 | 0 |

Furthermore, the colorant represented by the general formula II has particularly good gas resistance when the content of a component in which x+y=3 is smaller than that of a component in which x+y=4. A ratio between the contents of the respective components can be determined by: analyzing the colorant represented by the general formula II by means of high performance liquid chromatography at a wavelength of 254 nm; and calculating a ratio at each molecular weight.

[Yellow Colorant and Cyan Colorant]

The ink according to the present invention may contain another colorant as required in addition to the above colorants as long as the addition of the other colorant provides an effect and does not impair the object and effect of the present invention. Hereinafter, yellow and cyan colorants, which are used in the ink according to the present invention, will be collectively shown.

Yellow Colorant

C.I. Direct Yellow: 8, 11, 12, 27, 28, 33, 39, 44, 50, 58, 85, 86, 87, 88, 89, 98, 100, 110, 132, and 173

C.I. Acid Yellow: 1, 3, 7, 11, 17, 23, 25, 29, 36, 38, 40, 42, 44, 76, 98, and 99

Colorant Represented by the General Formula I

Other Colorant Having a Yellow Color Tone

Cyan Colorant C.I. Direct Blue: 1, 15, 22, 25, 41, 76, 77, 80, 90, 98, 106, 108, 120, 158, 163, 168, and 226

C.I. Acid Blue: 1, 7, 9, 15, 22, 23, 25, 29, 40, 43, 59, 62, 74, 78, 80, 90, 100, 102, 104, 112, 117, 127, 138, 158, 161, 203, 204, 221, and 244

Colorant Having a Phthalocyanine Skeleton

Other Colorant Having a Cyan Color Tone

[Content of Colorant]

The lower limit of the total content of the colorants in the ink is preferably 0.1 mass % or more, or more preferably 1.0 mass % or more with respect to the total weight of the ink from the viewpoints of color developability, weatherability, and reliability. The upper limit of the total content is preferably 15 mass % or less, or more preferably 7 mass % or less. In particular, an ink with which an image excellent in both of color developability and weatherability can be obtained is obtained when the total content of the yellow colorants in the ink is 80 mass % or more with respect to the total content of the colorants in the ink.

In addition, when the total content of the colorant represented by the general formula I and C.I. Direct Yellow 132 is 85 mass % or more with respect to the total content of the yellow colorants, an ink with which an image more excellent in both of color developability and weatherability can be obtained is obtained. In addition, when the content of the colorant represented by the general formula I is 0.3 mass time to 2.0 mass times the content of C.I. Direct Yellow 132, an ink with which an image still more excellent in both of color developability and weatherability can be obtained is obtained.

(Aqueous Medium)

The ink of the present invention is prepared by dissolving or dispersing the above colorants into an aqueous medium mainly composed of water. The aqueous medium may be water alone, or may be one containing water and a water-soluble organic solvent. Any water-soluble organic solvent used as a solvent of an ink jet ink can be used without any problem, and examples of such a water-soluble organic solvent include an alcohol, a polyhydric alcohol, a polyglycol, a glycol ether, a nitrogen-containing polar solvent, a sulfur-containing polar solvent, a urea, a saccharide, and derivatives of them. Those solvents are used for applications such as: maintenance of moisture retention of ink; improvements in solubility and dispersibility of a colorant; and a penetrating agent for ink into recording paper. In addition, each of those solvents may be used alone, or two or more of them may be used in combination. In addition, deionized water (ion-exchanged water) is preferably used as water.

The content of the water-soluble organic solvent is in the range of preferably 1 mass % to 50 mass %, or more preferably 3 mass % to 40 mass % with respect to the total weight of the ink. In addition, the water content in the ink is preferably in the range of 30 mass % to 95 mass % with respect to the total weight of the ink in order to favorably maintain the solubility of the dye and the ejection stability of the ink.

(Other Components and Physical Properties of Ink)

The ink of the present invention may further contain, in addition to the above components, various additives such as a surfactant, a pH adjustor, a rust inhibitor, an antiseptic, an anti-fungus agent, an antioxidant, an anti-reducing agent, an evaporation promoter, a chelating agent, and a water-soluble polymer as required.

Specific examples of the surfactant include: anionic surfactants such as an aliphatic acid salt, a higher alcohol sulfate, a liquid fatty oil sulfate, and an alkylallylsulfonate; and nonionic surfactants such as a polyoxyethylene alkyl ether, a polyoxyethylene alkyl ester, a polyoxyethylene sorbitan alkyl ester, an acetylene alcohol, and an acetylene glycol. One or two or more of them may be appropriately selected and used. Of those, in particular, an acetylene alcohol or an acetylene glycol is preferable because of its excellent effect on permeability into plain paper.

The content of the surfactant, which varies depending on the kind of the surfactant, is preferably in the range of 0.01 mass % to 5 mass % with respect to the total weight of the ink. At this time, the amount of the surfactant to be added is preferably determined in such a manner that the surface tension of the ink at 25° C. becomes 10 mN/m (dyn/cm) or more (more preferably 20 mN/m or more and 60 mN/m or less). Addition of the surfactant to the ink allows the occurrence of, for example, shifted printing (displacement of a point of impact of an ink droplet) due to wetting of a nozzle tip to be effectively suppressed. In addition, the ink is preferably adjusted to have a desired viscosity or pH in order to obtain good ejection property in an ink jet recording apparatus.

[Other Inks]

In the case of full-color output, a cyan ink, a magenta ink, a yellow ink, and a black ink are preferably used in combination in addition to the ink of the present invention. An ink having the same tone and a low colorant concentration, that is so-called a pale ink may also be used in combination.

Specific examples of the colorants to be used in the cyan ink, the magenta ink, the yellow ink, and the black ink are shown below for each tone. Of course, the present invention is not limited to those colorants, and a generally used dye or pigment other than those colorants, or a newly synthesized dye or pigment may also be used. The lower limit of the content of a colorant is preferably 0.1 mass % or more, or more preferably 1.0 mass % or more with respect to the total weight of an ink. The upper limit of the content is preferably 15 mass % or less, or more preferably 7 mass % or less.

(Cyan Ink)

C.I. Direct Blue: 1, 15, 22, 25, 41, 76, 77, 80, 86, 90, 98, 106, 108, 120, 158, 163, 168, 199, 226, and 307

C.I. Acid Blue: 1, 7, 9, 15, 22, 23, 25, 29, 40, 43, 59, 62, 74, 78, 80, 90, 100, 102, 104, 112, 117, 127, 138, 158, 161, 203, 204, 221, and 244

Compound Represented by the General Formula II (Magenta Ink)

C.I. Direct Red: 2, 4, 9, 11, 20, 23, 24, 31, 39, 46, 62, 75, 79, 80, 83, 89, 95, 197, 201, 218, 220, 224, 225, 226, 227, 228, 229, and 230

C.I. Acid Red: 6, 8, 9, 13, 14, 18, 26, 27, 32, 35, 42, 51, 52, 80, 83, 87, 89, 92, 106, 114, 115, 133, 134, 145, 158, 198, 249, 265, and 289

C.I. Food Red: 87, 92, and 94

C.I. Direct Violet: 107

Dye represented by the following general formula III

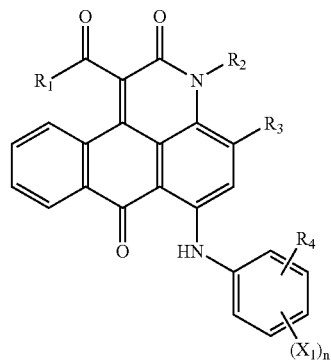

(In the general formula III: $R_1$ represents a substituted or unsubstituted alkoxy group, or a substituted or unsubstituted aryl group; $R_2$ and $R_4$ each independently represent a hydrogen atom, or a substituted or unsubstituted alkyl group; $R_3$ represents a hydrogen atom, a substituted or unsubstituted alkyl group, a substituted or unsubstituted alkoxy group, a substituted or unsubstituted aryloxy group, or a halogen atom; $X_1$ represents a carboxyl group or a sulfonic acid in a free acid form; and n represents 1 or 2.)

Dye in a free acid form represented by the following general formula IV

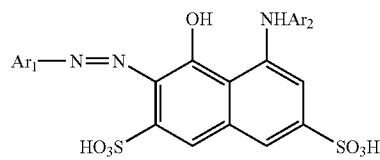

(In the general formula IV: $Ar_1$ represents a substituted or unsubstituted phenyl group, or a substituted or unsubstituted naphthyl group; and $Ar_2$ represents a substituted or unsubstituted acetyl group, a benzoyl group, a 1,3,5-triazinyl group, an $SO_2$—$C_6H_5$ group, or an $SO_2$—$C_6H_4$—$CH_3$ group.)

(Yellow Ink)

C.I. Direct Yellow: 8, 11, 12, 27, 28, 33, 39, 44, 50, 58, 85, 86, 87, 88, 89, 98, 100, 110, 132, and 173

C.I. Acid Yellow: 1, 3, 7, 11, 17, 23, 25, 29, 36, 38, 40, 42, 44, 76, 98, and 99

Compound Represented by the General Formula I (Black Ink)

C.I. Direct Black: 17, 19, 22, 31, 32, 51, 62, 71, 74, 112, 113, 154, 168, and 195

C.I. Acid Black: 2, 48, 51, 52, 110, 115, and 156

C.I. Food Black: 1 and 2

Carbon Black

Examples of carbon black include furnace black, lamp black, acetylene black, and channel black. Specific examples thereof include: Raven 7000, Raven 5750, Raven 5250, Raven 5000, Raven 3500, Raven 2000, Raven 1500, Raven 1250, Raven 1200, Raven 1190ULTRA-II, Raven 1170, and Raven 1255 (all of them are manufactured by Columbia); Black Pearls L, Regal 400R, Regal 330R, Regal 660R, Mogul L, Monarch 700, Monarch 800, Monarch 880, Monarch 900, Monarch 1000, Monarch 1100, Monarch 1300, Monarch 1400, and Valcan XC-72R (all of them are manufactured by Cabot Corporation); Color Black FW1, Color Black FW2, Color Black FW2V, Color Black FW18, Color Black FW200, Color Black S150, Color Black S160, Color Black S170, Printex 35, Printex U, Printex V, Printex 140U, Printex 140V, Special Black 6, Special Black 5, Special Black 4A, and Special Black 4 (all of them are manufactured by Degussa); and No. 25, No., 33, No. 40, No. 47, No. 52, No. 900, No. 2300, MCF-88, MA600, MA7, MA8, and MA100 (all of them are manufactured by Mitsubishi Chemical Corporation). A magnetic material fine particle such as magnetite or ferrite, titanium black, or the like may also be used as a black pigment.

A dispersant is preferably used in combination when a pigment is used as a colorant. A dispersant capable of stably dispersing any one of the above pigments into an aqueous medium by virtue of an action of an anionic group is preferably used. Specific examples of the dispersant include a styrene-acrylic acid copolymer, a styrene-acrylic acid-alkyl acrylate copolymer, a styrene-maleic acid copolymer, a styrene-maleic acid-alkyl acrylate copolymer, a styrene-methacrylic acid copolymer, a styrene-methacrylic acid-alkyl acrylate copolymer, a styrene-half maleate copolymer, a vinyl naphthalene-acrylic acid copolymer, a vinyl naphthalene-maleic acid copolymer, a styrene-maleic anhydride-half maleate copolymer, and salts of them. Each of those dispersants preferably has a weight average molecular weight in the range of 1,000 to 30,000.

A pigment that can be dispersed into an aqueous medium without any dispersant by connecting an ionic group (anionic group) to the pigment surface, that is so-called a self-dispersing pigment can also be used. An example of such a pigment includes self-dispersing carbon black. An example of the self-dispersing carbon black includes one in which an anionic group is bound to the carbon black surface.

[Recording Medium]

Examples of a recording medium used in forming an image by means of the ink according to the present invention include recording media generally used such as: plain paper; and a special medium having a coating layer or an ink receiving layer on its surface and referred to as gloss paper, coated paper, or gloss film. Of those, a special medium having a hydrophilic porous particle layer, porous polymer layer, or the like on a substrate can be exemplified as a recording medium with which an image with improved visibility, contrast, and transparency can be obtained.

An example of a special medium as a recording medium to be used in the present invention will be further detailed. In the recording medium, fine particles for forming a hydrophilic porous structure in an ink receiving layer are allowed to adsorb a colorant such as a dye or a pigment, and an image is formed by at least the adsorbed colorant. The recording medium is particularly suitable for the case where an ink jet method is utilized. Such a recording medium is preferably of a so-called absorption type in which ink is absorbed by a void formed in an ink receiving layer on a support.

An ink receiving layer of an absorption type is constituted as a hydrophilic porous layer mainly composed of fine particles and containing a binder and other additives as required. Examples of the fine particles include: inorganic pigments such as silica, clay, talc, calcium carbonate, kaolin, aluminum oxide (for example, alumina or alumina hydrate), diatomaceous earth, titanium oxide, hydrotalcite, and zinc oxide; and organic pigments such as a urea formalin resin, an ethylene resin, and a styrene resin. At least one of them is used.

Examples of a binder suitably used include a water-soluble polymer and a latex. Examples thereof include: polyvinyl alcohol or a modified product thereof; starch or a modified product thereof; gelatin or a modified product thereof; gum arabic; cellulose derivatives such as carboxymethyl cellulose, hydroxyethyl cellulose, and hydroxypropyl methylcellulose; vinyl-based copolymer latexes such as an SBR latex, an NBR latex, a methyl methacrylate-butadiene copolymer latex, a functional group-modified polymer latex, and an ethylene vinyl acetate copolymer; polyvinyl pyrrolidone; maleic anhydride or a copolymer thereof; and an acrylate copolymer. Two or more of them can be used in combination as required. An additive may also be used as required, and examples thereof include a dispersant, a thickening agent, a pH adjustor, a lubricant, a fluidity denaturing agent, a surfactant, an antifoaming agent, a releasing agent, a fluorescent bleach, a UV absorber, and an antioxidant.

[Recording Method and Recording Apparatus]

Any one of conventionally and generally used apparatuses such as an offset printing apparatus, a gravure printing apparatus, an electrophotographic printing apparatus, and an ink jet recording apparatus may be used for a recording method and a recording apparatus suitable for recording an image on a recording medium by means of the ink according to the present invention. Of those, an ink jet recording apparatus is preferably applied.

In an embodiment of the present invention, a recording apparatus may be used, in which, in addition to the ink of the present invention, inks having different hues such as a cyan ink, a magenta ink, a yellow ink, and a black ink, or pale inks having the same tones as those of the inks are used in combination to obtain a full-color image.

Out of the recording apparatuses described above, an ink jet recording apparatus can find use in a wide variety of applications including printers, facsimiles, and copying machines, and hence can be exemplified as one preferable embodiment of the present invention. The reason for this is, for example, as follows. When a device for recording the ink of the present invention is installed in the recording apparatus, the resultant apparatus can be obtained at a low cost, can be miniaturized, and generates low noise.

(Recording Apparatus)

Hereinafter, the constitution of the main body of an ink jet recording apparatus will be described. First, a mechanism portion in a recording apparatus will be described. The main body of the recording apparatus is constituted by a sheet-feeding portion, a sheet-conveying portion, a carriage portion, a sheet-discharge portion, a cleaning portion, and an exterior packaging portion for protecting them and providing them with design from the roles of the respective mechanisms. Hereinafter, the outlines of those portions will be described.

Figure 2:
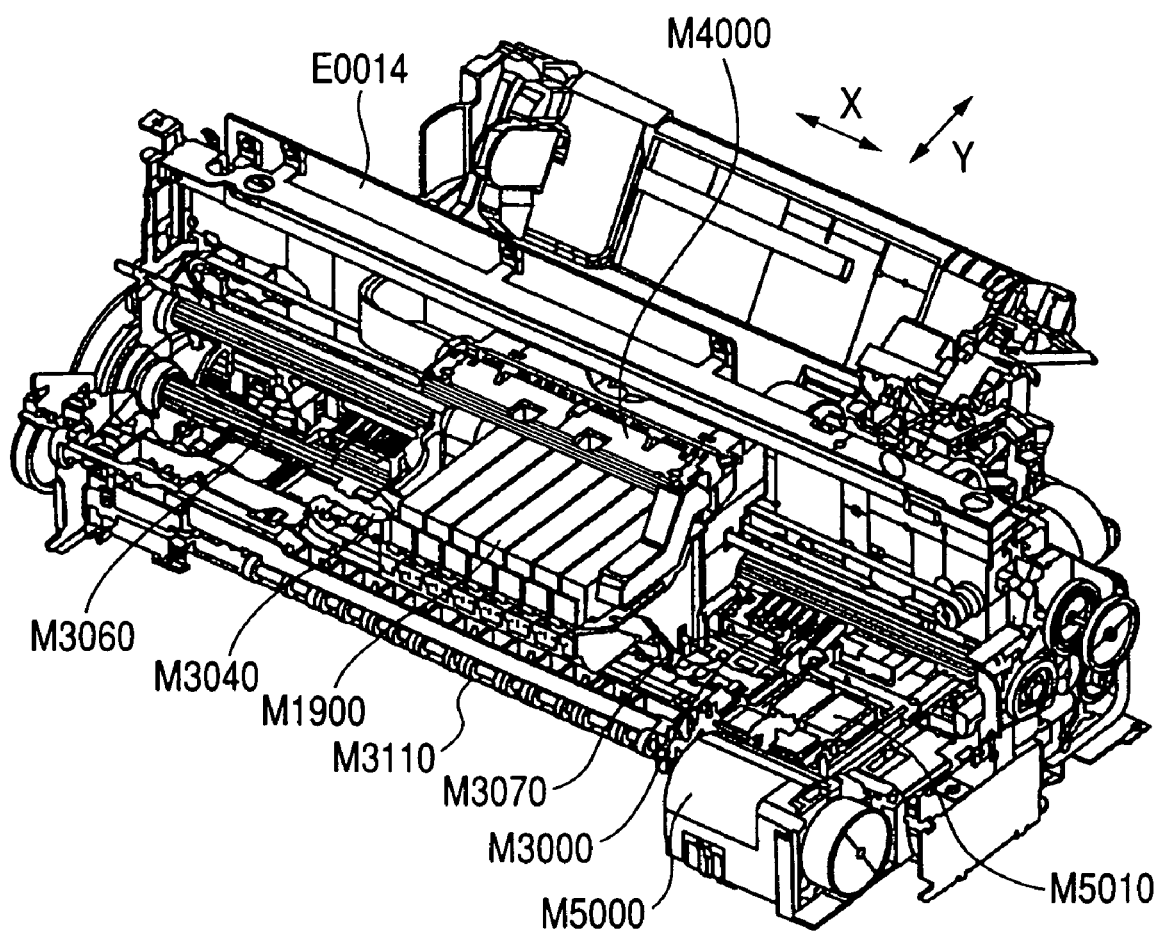
FIG. 2 is a perspective view of a mechanism portion of the recording apparatus.
Figure 3:
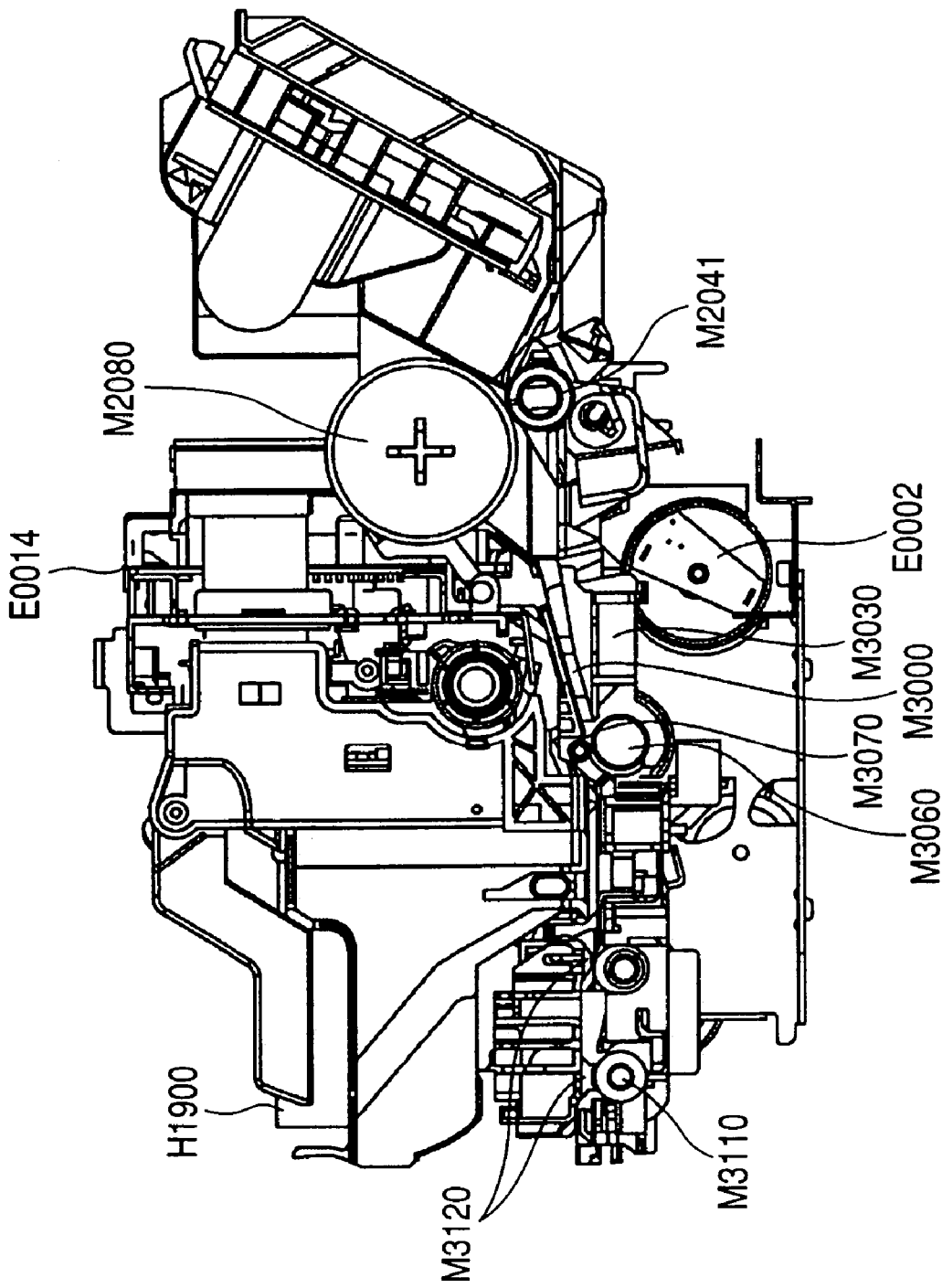
FIG. 3 is a sectional view of the recording apparatus.

FIG. 1 is a perspective view of the recording apparatus, and each of FIG. 2 and FIG. 3 is a view for explaining the internal mechanism of the main body of the recording apparatus. FIG. 2 is a perspective view of the mechanism viewed from an upper right portion, and FIG. 3 is a side sectional view of the main body of the recording apparatus.

When sheet feeding is performed in the recording apparatus, only a predetermined number of recording media are fed at the sheet-feeding portion to a nip portion composed of a sheet-feeding roller M2080 and a separating roller M2041. The fed recording media are separated at the nip portion, and only the uppermost recording medium is conveyed. The recording medium fed to the sheet-conveying portion is fed to a roller pair composed of a conveying roller M3060 and a pinch roller M3070 while being guided by a pinch roller holder M3000 and a paper guide flapper M3030. The roller pair composed of the conveying roller M3060 and the pinch roller M3070 is rotated by driving of an LF motor E0002. With the rotation, the recording medium is conveyed over a platen M3040.

When an image is to be formed on a recording medium, in the carriage portion, a recording head H1001 is placed at a target image formation position, and ink is ejected to the recording medium in accordance with a signal from an electrical substrate E0014. Details about the recording head H1001 will be described later. While recording is performed by the recording head H1001, recording main scanning in which a carriage M4000 scans in a column direction and sub-scanning in which the recording medium is conveyed in a row direction by the conveying roller M3060 are alternately repeated, whereby an image is formed on the recording medium. In the sheet-discharge portion, the last recording medium on which an image has been formed is conveyed while being sandwiched by a nip between a first sheet-discharge roller M3110 and a spur M3120 to be discharged to a sheet-discharge tray M3160.

In the cleaning portion, a pump M5000 is allowed to act in a state where a cap M5010 is brought into close contact with an ink ejection port of the recording head H1001 for the purpose of cleaning the recording head H1001 before and after image recording, whereby unnecessary ink and the like are sucked from the recording head H1001. In addition, ink remaining on the cap M5010 is sucked in a state where the cap M5010 is opened, whereby consideration is given so that neither stick of the residual ink nor subsequent harmful effect occurs.

(Constitution of Recording Head)

Hereinafter, the constitution of a head cartridge H1000 will be described. The head cartridge H1000 includes the recording head H1001, means for mounting ink tanks H1900, and means for supplying ink from the ink tanks H1900 to the recording head. The head cartridge H1000 is detachably mounted on the carriage M4000.

Figure 4:
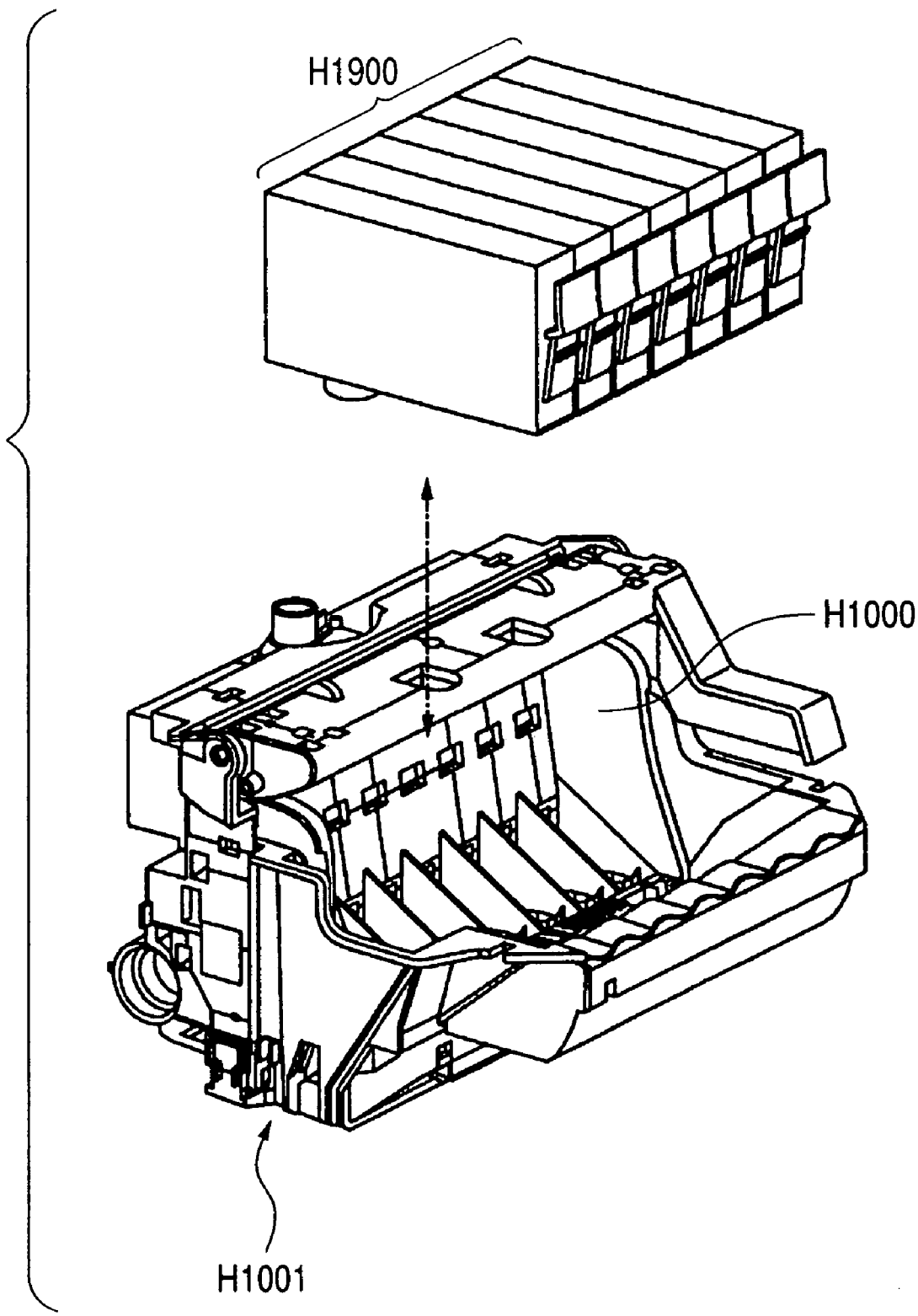
FIG. 4 is a perspective view showing a state where an ink tank is mounted on a head cartridge.

FIG. 4 shows how the ink tanks H1900 are mounted on the head cartridge H1000. The ink tanks H1900 are prepared independently for 7 colors, that is, the ink of the present invention, cyan, magenta, yellow, black, light cyan, and light magenta because the recording apparatus forms an image by means of inks of the above 7 colors.

Figure 5:
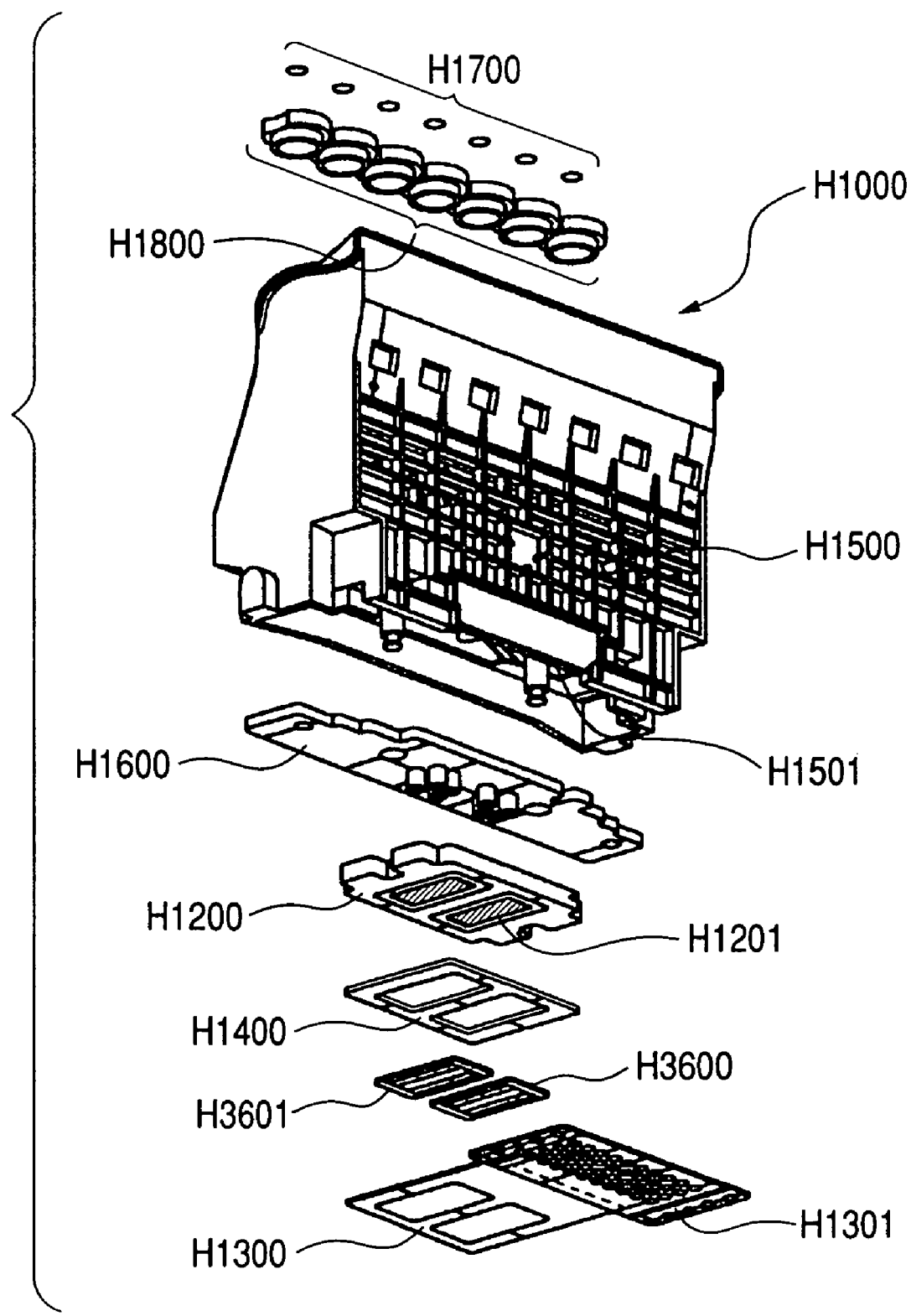
FIG. 5 is an exploded perspective view of the head cartridge.

FIG. 5 is an exploded perspective view of the head cartridge H1000. In the figure, the head cartridge H1000 includes a first recording element substrate H3600, a second recording element substrate H3601, a first plate H1200, a second plate H1400, an electric wiring substrate H1300, a tank holder H1500, a flow path forming member H1600, a filter H1700, and a seal rubber H1800.

Inks of the ink tanks H1900 prepared for 7 colors are distributed to 9 nozzle arrays, whereby the respective inks are distributed to the first recording element substrate H3600 and the second recording element substrate H3601 on which the respective nozzle arrays are formed.

Each of the first recording element substrate H3600 and the second recording element substrate H3601 is a Si substrate, and multiple recording elements (nozzles) for ejecting ink are formed on one surface of the substrate by photolithography. Electric wiring such as Al for supplying power to each recording element is formed by a film formation technique, and multiple ink flow paths corresponding to the respective recording elements are also formed by photolithography. Furthermore, ink supply ports for supplying ink to the multiple ink flow paths are formed so as to be opened to the rear surface.

Figure 6:
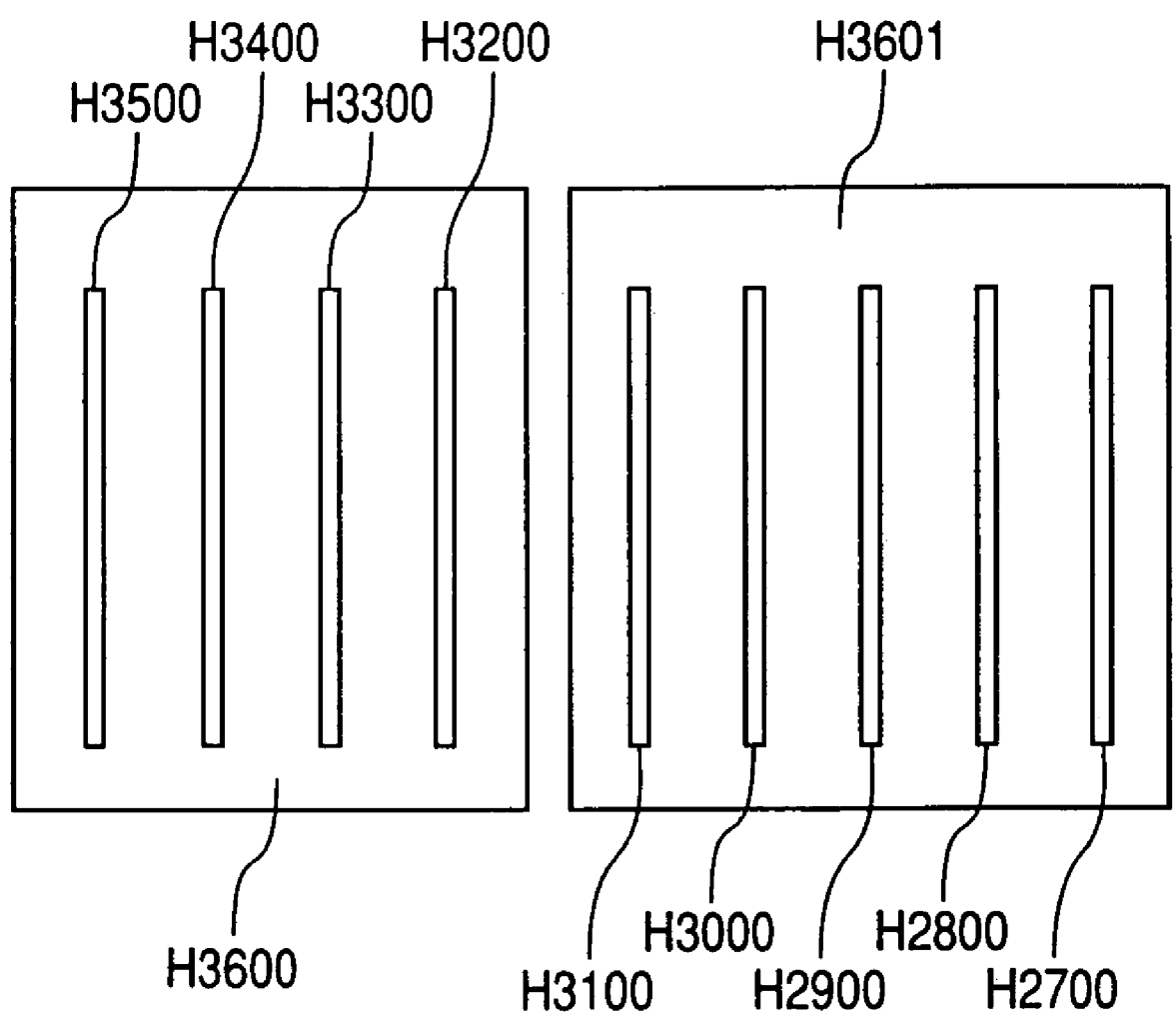
FIG. 6 is a front view showing recording element substrates in the head cartridge.

FIG. 6 is a front enlarged view for explaining the constitutions of the first recording element substrate H3600 and the second recording element substrate H3601. Reference symbols H2700 to H3500 denote nozzle arrays corresponding to ink colors different from one another or to the same ink color. The first recording element substrate H3600 has nozzle arrays for 4 colors: the nozzle array H3200 to which a light cyan ink is supplied, the nozzle array H3300 to which a black ink is supplied, the nozzle array H3400 to which the ink of the present invention is supplied, and the nozzle array H3500 to which a light magenta ink is supplied.

The second recording element substrate H3601 has 5 nozzle trains for 3 colors: the 2 nozzle arrays H2700 and H3100 to which a cyan ink is supplied, the 2 nozzle arrays H2800 and H3000 to which a magenta ink is supplied, and the nozzle array H2900 to which a yellow ink is supplied. Nozzle arrays of magenta/cyan are arranged on both sides so as to be linearly symmetric with respect to the nozzle array H2900 for a yellow ink.

Each nozzle array is composed of 768 nozzles arranged at an interval of 1,200 dpi (dot/inch; reference value) in a conveyance direction of a recording medium, and ejects about 2 pl of ink droplet. An opening area in each nozzle ejection port is set to be about 100 μm$^2$.

If nozzle arrays of cyan, magenta, and yellow are arranged so as to be symmetric with respect to the scanning direction of the carriage M4000, an image failure called color unevenness can be reduced when bidirectional printing is performed by the carriage M4000. Color unevenness is mainly caused by a difference in color developability occurring owing to a difference in order of ink colors to impact on a recording medium. If 2 nozzle arrays of magenta (and 2 nozzle arrays of cyan) are arranged so as to be symmetric with respect to the nozzle array H2900 for a yellow ink, the order of inks to impact on a recording medium can be uniformed by switching a nozzle array to be used for each of a going way and a returning way. Accordingly, in this embodiment, a high-quality image can be formed at high speed and bidirectionally.

All the nozzle arrays for 7 colors to be used are preferably symmetrically arranged. However, such symmetrical arrangement involves an increase in size of the apparatus, an increase in cost, and complexity of data processing. In view of the above, only nozzle arrays for 3 colors greatly contributing to color unevenness at the time of bidirectional printing, that is, cyan, magenta, and yellow are symmetrically arranged.

In addition, in an ink flow path H1501, each of a flow path for a cyan ink and a flow path for a magenta ink is bifurcated on its way, whereby an ink supplied from one ink tank can be distributed to 2 nozzle arrays.

Here, a recording head of a bubble jet system for performing recording by using an electrothermal converter (recording element) that generates thermal energy for causing film boiling to occur in ink in accordance with an electrical signal has been described as an embodiment of a recording head. The representative constitution or principle to be used for such a recording head is preferably a basic principle disclosed in, for example, U.S. Pat. Nos. 4,723,129 or 4,740,796. The system is applicable to any one of so-called on-demand and continuous types, but is particularly effective for the on-demand type. The reason for this is as follows. At least one driving signal corresponding to recording information and providing a rapid temperature increase exceeding film boiling is applied to an electrothermal converter arranged in correspondence with a sheet or liquid flow path holding a liquid (ink), whereby the electrothermal converter is caused to generate thermal energy. Then, film boiling is caused to occur on a heat operating surface of a recording head. As a result, an air bubble in one-to-one correspondence with the driving signal can be formed in the liquid (ink). The liquid (ink) is ejected through an opening for ejection by the growth and contraction of the air bubble, to thereby form at least one droplet. The driving signal is more preferably of a pulse shape because the growth and contraction of the air bubble occur immediately and appropriately, and hence the ejection of the liquid (ink) particularly excellent in responsiveness can be achieved.

In addition, an on-demand ink jet recording head can be exemplified as a second embodiment of an ink jet recording apparatus utilizing mechanical energy. The on-demand ink jet recording head includes: a nozzle formation substrate having multiple nozzles; a pressure generating element composed of a piezoelectric material and a conductive material and arranged to be opposite to the nozzles; and ink with which the periphery of the pressure generating element is filled. In the recording head, a voltage is applied to displace the pressure generating element, thereby ejecting small ink droplets from the nozzles.

(Ink Cartridge)

An ink cartridge storing ink to be supplied to a recording head through an ink supply member such as a tube is also used.

In addition, the ink jet recording apparatus to be used in the present invention is not limited to the one in which a head and an ink cartridge are separate from each other as described above, and one in which they are integrated is also preferably used. In addition, the ink jet recording apparatus to be used in the present invention may be structured such that no ink absorber is used and an ink storage portion is, for example, an ink bag having a spring or the like in it.

EXAMPLES

Hereinafter, the present invention will be described more specifically by way of examples and comparative examples. However, the present invention is not limited to the following examples without departing from the scope of the present invention. The terms "%" and "part(s)" in the following description refer to "mass %" and "part(s) by mass" unless otherwise stated.

Preparation of Inks of Examples 1 to 10 and Comparative Examples 1 to 3

The respective components shown in Tables 2 to 4 below were mixed with water to have a total amount of 100 parts, and stirred sufficiently and dissolved. The resultant was filtered through a microfilter having a pore size of 0.2 μm (manufactured by Fuji Photo Film Co., Ltd.) under pressure to prepare each of inks of Examples 1 to 10 and Comparative Examples 1 to 3. Tables 2 to 4 also show the characteristics of the inks of Examples 1 to 10 and Comparative Examples 1 to 3.

TABLE 2

| | | Example | | | | |
|---|---|---|---|---|---|---|
| | | 1 | 2 | 3 | 4 | 5 |
| Yellow Colorant | Exemplified Compound 1 | 0.60 | 1.60 | 0.40 | 1.80 | 1.02 |
| | C.I. Direct Yellow 132 | 1.80 | 0.80 | 2.00 | 0.60 | 1.02 |
| | C.I. Direct Yellow 86 | | | | | 0.36 |
| Cyan colorant | Colorant represented by general formula II(*1) | 0.60 | 0.60 | 0.60 | 0.60 | 0.60 |
| Glycerin | | 7.50 | 7.50 | 7.50 | 7.50 | 7.50 |
| 1,5-pentanediol | | 7.50 | 7.50 | 7.50 | 7.50 | 7.50 |
| Ethylene urea | | 6.00 | 6.00 | 6.00 | 6.00 | 6.00 |
| Acetylenol EH(*2) | | 0.80 | 0.80 | 0.80 | 0.80 | 0.80 |
| Water | | 75.20 | 75.20 | 75.20 | 75.20 | 75.20 |
| Y colorant/all colorants(*3) (%) | | 80 | 80 | 80 | 80 | 80 |
| (General formula I + DY132)/Y colorant(*4) (%) | | 100 | 100 | 100 | 100 | 85 |
| General formula I/ DY132(*5) (mass time) | | 0.3 | 2.0 | 0.2 | 3.0 | 1.0 |

(*1)The value of $(x + y = 4)/(x + y = 3)$ in the colorant represented by the general formula II is 2.3.
(*2)Acetylene glycol ethylene oxide adduct (surfactant) manufactured by Kawaken Fine Chemicals Co., Ltd.
(*3)Y: Yellow
(*4)DY132: C.I. Direct Yellow 132, Y: Yellow
(*5)DY132: C.I. Direct Yellow 132

TABLE 3

| | | Example | | | | |
|---|---|---|---|---|---|---|
| | | 6 | 7 | 8 | 9 | 10 |
| Yellow Colorant | Exemplified Compound 1 | 1.05 | 1.57 | 0.60 | 1.63 | 1.01 |
| | C.I. Direct Yellow 132 | 1.05 | 0.53 | 1.80 | 0.77 | 1.01 |
| | C.I. Direct Yellow 86 | | | | | 0.38 |
| Cyan colorant | Colorant represented by general formula II(*1) | 0.90 | 0.90 | 0.65 | 0.60 | 0.60 |
| Glycerin | | 7.50 | 7.50 | 7.50 | 7.50 | 7.50 |
| 1,5-pentanediol | | 7.50 | 7.50 | 7.50 | 7.50 | 7.50 |
| Ethylene urea | | 6.00 | 6.00 | 6.00 | 6.00 | 6.00 |
| Acetylenol EH(*2) | | 0.80 | 0.80 | 0.80 | 0.80 | 0.80 |
| Water | | 75.20 | 75.20 | 75.15 | 75.20 | 75.20 |
| Y colorant/all colorants(*3) | | 70 | 70 | 79 | 80 | 80 |

TABLE 3-continued

|  | Example | | | | |
|---|---|---|---|---|---|
|  | 6 | 7 | 8 | 9 | 10 |
| (General formula I + DY132)/Y colorant(*4) | 100 | 100 | 100 | 100 | 84 |
| General formula I/ DY132(*5) | 1.0 | 3.0 | 0.3 | 2.1 | 1.0 |

(*1)The value of (x + y = 4)/(x + y = 3) in the colorant represented by the general formula II is 2.3.
(*2)Acetylene glycol ethylene oxide adduct (surfactant) manufactured by Kawaken Fine Chemicals Co., Ltd.
(*3)Y: Yellow
(*4)DY132: C.I. Direct Yellow 132, Y: Yellow
(*5)DY132: C.I. Direct Yellow 132

TABLE 4

|  |  | Comparative Example | | |
|---|---|---|---|---|
|  |  | 1 | 2 | 3 |
| Yellow colorant | Exemplified Compound 1 | 2.40 |  | 1.60 |
|  | C.I. Direct Yellow 132 |  | 2.40 |  |
|  | C.I. Direct Yellow 86 |  |  | 0.80 |
| Cyan colorant | Colorant represented by general formula II(*1) | 0.60 | 0.60 | 0.60 |
| Glycerin |  | 7.50 | 7.50 | 7.50 |
| 1,5-pentanediol |  | 7.50 | 7.50 | 7.50 |
| Ethylene urea |  | 6.00 | 6.00 | 6.00 |
| Acetylenol EH(*2) |  | 0.80 | 0.80 | 0.80 |
| Water |  | 75.20 | 75.20 | 75.20 |
| Y colorant/ all colorants(*3) |  | 80 | 80 | 80 |
| (General formula I + DY132)/Y colorant(*4) |  | 100 | 100 | 67 |
| General formula I/ DY132(*5) |  | — | 0.0 | — |

(*1)The value of (x + y = 4)/(x + y = 3) in the colorant represented by the general formula II is 2.3.
(*2)Acetylene glycol ethylene oxide adduct (surfactant) manufactured by Kawaken Fine Chemicals Co., Ltd.
(*3)Y: Yellow
(*4)DY132: C.I. Direct Yellow 132, Y: Yellow
(*5)DY132: C.I. Direct Yellow 132

Evaluation of Examples 1 to 10 and Comparative Examples 1 to 3

Each of the resultant inks was charged into an ink cartridge for a PIXUS 950i manufactured by Canon Inc., and an image was formed by means of the PIXUS 950i. The image was evaluated for the following evaluation items. Table 5 shows the results of the evaluation.

The term "100% duty" of a solid printing portion to be recorded by the above recording apparatus means that one dot of each of all pixels is applied at a resolution of 2,400×1,200 dpi. In this case, 2.5 ng of ink are applied per dot. L*, a*, and b* of the image were measured by means of a Gretag Spectrolino manufactured by Gretag under the conditions of: an observation light source of D50; and an observation field of view of 2 degrees.

Color Developability

A solid image of 100% duty was formed on an SP-101 manufactured by Canon Inc. as a recording medium. L*, a*, and b* of the resultant image were measured, and a chroma (C*) was calculated according to the following equation to evaluate the image for color developability. The evaluation criteria for color developability are as follows.

$$C^* = (a^{*2} + b^{*2})^{1/2}$$

The evaluation of the color developability was performed by using the calculated (C*) according to the following criteria.
A: C* of 85 or more.
B: C* of 80 or more and less than 85.
C: C* of less than 80.

Light Resistance

A solid image was formed on an SP-101 manufactured by Canon Inc. as a recording medium by changing gradation in the duty range of 1 to 100% in a stepwise manner. ΔE of a portion having an intermediate tone and particularly poor in light resistance (30% duty, a total dye application density of 0.06 mg/inch$^2$) of the resultant image was calculated according to the following method to evaluate the image for light resistance. The evaluation method and evaluation criteria for light resistance are as follows.

Evaluation apparatus; Xenon fade meter Ci35 manufactured by Atlas

Exposure conditions; temperature of 25° C., relative humidity of 55%, illuminance of a xenon lamp of 0.39 W/m$^2$, 30 hours Evaluation method; CIE L*a*b* of a test sample each of before and after exposure was measured. ΔE was calculated according to the following formula.

$$\Delta E = (\Delta L^{*2} + \Delta a^{*2} + \Delta b^{*2})^{1/2}$$

A: ΔE of less than 15.
B: ΔE of 15 or more and less than 20.
C: ΔE of 20 or more.

Gas Resistance

A solid image was formed on an SP-101 manufactured by Canon Inc. as a recording medium by changing gradation in the duty range of 1 to 100% in a stepwise manner. ΔE of a portion having an intermediate tone and particularly poor in gas resistance (100% duty, a total dye application density of 0.27 mg/inch$^2$) of the resultant image was calculated according to the following method to evaluate the image for gas resistance. The evaluation method and evaluation criteria for gas resistance are as follows.

Evaluation apparatus; Ozone fade meter

Exposure conditions; temperature of 40° C., relative humidity of 55%, 2 hours under an ozone atmosphere of 3 ppm Evaluation method; CIE L*a*b* of a test sample each of before and after exposure was measured. ΔE was calculated according to the following formula.

$$\Delta E = (\Delta L^{*2} + \Delta a^{*2} + \Delta b^{*2})^{1/2}$$

A: ΔE of less than 20.
B: ΔE of 20 or more and less than 25.
C: ΔE of 25 or more.

TABLE 5

|  |  | Color developability C* | Light resistance ΔE | Gas resistance ΔE |
|---|---|---|---|---|
| Example | 1 | A | A | A |
|  | 2 | A | A | A |
|  | 3 | A | A | A |
|  | 4 | A | B | B |
|  | 5 | A | B | A |
|  | 6 | B | B | A |
|  | 7 | B | B | A |
|  | 8 | B | A | A |
|  | 9 | A | B | B |
|  | 10 | B | B | A |

TABLE 5-continued

| | | Color developability C* | Light resistance ΔE | Gas resistance ΔE |
|---|---|---|---|---|
| Comparative Example | 1 | A | C | B |
| | 2 | B | B | B |
| | 3 | B | B | B |

As is apparent from Table 5 above, in each of Examples 1 to 10, an image excellent in both of color developability and weatherability (light resistance and gas resistance) was obtained. On the other hand, in each of Comparative Examples 1 to 3, the resultant image was poor in weatherability. In addition, in each of Comparative Examples 2 and 3, the resultant image was poor in color developability and weatherability. As can be seen from Example 2 and Comparative Example 3, it was able to effectively prevent a reduction in weatherability even in an ink containing the colorant represented by the general formula I and the colorant having a phthalocyanine skeleton by adopting the constitution of the present invention involving the combined use of C.I. Direct Yellow 132. According to the above evaluation criteria, there was no difference between Example 1 and Example 3 because each of them were evaluated "A" in all respects. However, the color developability in Example 1 was superior to that in Example 3.

The present application claims the priority from Japanese Patent Application No. 2004-114671 filed on Apr. 8, 2004, which makes a part of the present application by reference.

This application claims priority from Japanese Patent Application No. 2004-114671 filed Apr. 8, 2004, which is hereby incorporated by reference herein.

What is claimed is:

1. An ink comprising yellow colorants and a colorant having a phthalocyanine skeleton, wherein the yellow colorants comprise at least a colorant represented by the following general formula I and C .I. Direct Yellow 132

General formula I

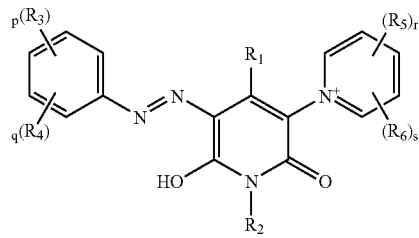

wherein $R_1$ and $R_2$ each independently represent a substituted or unsubstituted alkyl group, aryl group, or arylalkyl group, or a hydrogen atom; $R_3$ and $R_5$ each independently represent a carboxyl group or a salt thereof, a sulfonic group or a salt thereof, a phosphate group or a salt thereof, or an alkyl group in which any one of these groups is substituted; $R_4$ and $R_6$ each independently represent a group except those defined for $R_3$ and $R_5$; p and r each independently represent an integer of 1 to 5; q and s each independently represent an integer of 0 to 4; and $p+q \leq 5$ and $r+s \leq 5$, wherein a total content of the yellow colorants in the ink is 80 mass % or more with respect to the total content of the colorants in the ink, and wherein a total content of the colorant represented by the general formula I and C.I. Direct Yellow 132 is 85 mass % or more with respect to the total content of the yellow colorants.

2. An ink according to claim 1, wherein a content of the colorant represented by the general formula I in the ink is 0.3 mass times to 2.0 mass times a content of C.I. Direct Yellow 132 in the ink.

3. An ink according to claim 1, wherein the colorant represented by the general formula I comprises one of a colorant represented by the following structural formula I and a salt thereof Structural formula I

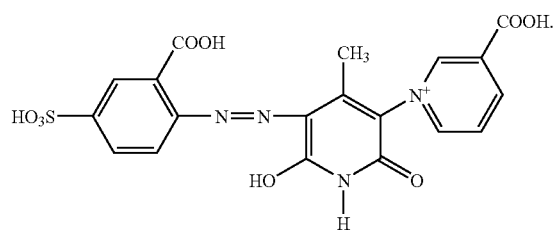

4. An ink jet recording method, comprising applying the ink according to any one of claims 1, 2 and 3 to a recording medium by means of an ink jet head to form an image.

5. An ink cartridge comprising the ink according to any one of claims 1, 2 and 3 stored therein.

6. An ink jet recording apparatus, comprising the ink according to any one of claims 1, 2 and 3 mounted thereon.

* * * * *

UNITED STATES PATENT AND TRADEMARK OFFICE
CERTIFICATE OF CORRECTION

PATENT NO.        : 7,208,033 B2
APPLICATION NO.   : 11/233016
DATED             : April 24, 2007
INVENTOR(S)       : Minako Kawabe et al.

It is certified that error appears in the above-identified patent and that said Letters Patent is hereby corrected as shown below:

ON THE TITLE PAGE
At Item (56), under the U.S. PATENT DOCUMENTS section:

"6,685,999 B2    2/2004    Ichihose et al." should read
    --6,685,999 B2    2/2004    Ichinose et al.--;

"6,863,391 B2    3/2005    Tomloka et al." should read
    --6,862,391 B2    3/2005    Tomioka et al.--;

"2004/0244622 A1    12/2004    Ichihose et al." should read
    --2004/0244622 A1    12/2004    Ichinose et al.--;

"2005/0057607 A1    3/2005    Tomloka et al." should read
    --2005/0057607 A1    3/2005    Tomioka et al.--;

"2006/0152570 A1    7/2006    Ishlkawa et al." should read
    --2006/0152570 A1    7/2006    Ishikawa et al.--; and "2006/0139429 A1    6/2006    Osuml et al." should read
    --2006/0139429 A1    6/2006    Osumi et al.--.

At Item (56), under the FOREIGN PATENT DOCUMENTS section, "2006/071822" should read --2006-071822--.

At Item (56), under the OTHER PUBLICATIONS section, "JP2006/071822" should read --JP 2006-071822--.

UNITED STATES PATENT AND TRADEMARK OFFICE
CERTIFICATE OF CORRECTION

PATENT NO. : 7,208,033 B2
APPLICATION NO. : 11/233016
DATED : April 24, 2007
INVENTOR(S) : Minako Kawabe et al.

It is certified that error appears in the above-identified patent and that said Letters Patent is hereby corrected as shown below:

<u>COLUMN 6</u>

Line 40, "Cyan Colorant C.I. Direct Blue:" should read
--Cyan Colorant
C.I. Direct Blue:--.

<u>COLUMN 17</u>

Line 51 claim 1, "$R_2$each" should read --$R_2$ each--.

Signed and Sealed this

Eighteenth Day of March, 2008

JON W. DUDAS
*Director of the United States Patent and Trademark Office*

UNITED STATES PATENT AND TRADEMARK OFFICE
CERTIFICATE OF CORRECTION

PATENT NO. : 7,208,033 B2
APPLICATION NO. : 11/233016
DATED : April 24, 2007
INVENTOR(S) : Minako Kawabe et al.

It is certified that error appears in the above-identified patent and that said Letters Patent is hereby corrected as shown below:

ON THE TITLE PAGE
At Item (56), under the U.S. PATENT DOCUMENTS section:

"6,685,999 B2   2/2004   Ichihose et al." should read
--6,685,999 B2  2/2004   Ichinose et al.--;

"6,863,391 B2   3/2005   Tomloka et al." should read
--6,862,391 B2  3/2005   Tomioka et al.--;

"2004/0244622 A1   12/2004   Ichihose et al." should read
--2004/0244622 A1  12/2004   Ichinose et al.--;

"2005/0057607 A1   3/2005   Tomloka et al." should read
--2005/0057607 A1  3/2005   Tomioka et al.--;

"2006/0152570 A1   7/2006   Ishlkawa et al." should read
--2006/0152570 A1  7/2006   Ishikawa et al.--; and "2006/0139429 A1   6/2006   Osuml et al." should read
--2006/0139429 A1  6/2006   Osumi et al.--.

At Item (56), under the FOREIGN PATENT DOCUMENTS section, "2006/071822" should read --2006-071822--.

At Item (56), under the OTHER PUBLICATIONS section, "JP2006/071822" should read --JP 2006-071822--.

UNITED STATES PATENT AND TRADEMARK OFFICE
CERTIFICATE OF CORRECTION

PATENT NO. : 7,208,033 B2
APPLICATION NO. : 11/233016
DATED : April 24, 2007
INVENTOR(S) : Minako Kawabe et al.

It is certified that error appears in the above-identified patent and that said Letters Patent is hereby corrected as shown below:

COLUMN 6

Line 40, "Cyan Colorant C.I. Direct Blue:" should read
--Cyan Colorant
C.I. Direct Blue:--.

COLUMN 17

Line 51, "$R_2$each" should read --$R_2$ each--.

Signed and Sealed this

Twenty-fifth Day of March, 2008

JON W. DUDAS
*Director of the United States Patent and Trademark Office*